US008560306B2

(12) United States Patent
Sung et al.

(10) Patent No.: US 8,560,306 B2
(45) Date of Patent: Oct. 15, 2013

(54) METHOD AND APPARATUS TO SEARCH FIXED CODEBOOK USING TRACKS OF A TRELLIS STRUCTURE WITH EACH TRACK BEING A UNION OF TRACKS OF AN ALGEBRAIC CODEBOOK

(75) Inventors: Hosang Sung, Yongin-si (KR);
Kungeun Lee, Gangneung-si (KR);
Sang-won Kang, Seongnam-si (KR);
Thomas R. Fischer, Pullman, WA (US);
Ja-kyoung Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 11/457,251

(22) Filed: Jul. 13, 2006

(65) Prior Publication Data

US 2007/0016410 A1    Jan. 18, 2007

(30) Foreign Application Priority Data

Jul. 13, 2005 (KR) .................. 10-2005-0063267
Jul. 11, 2006 (KR) .................. 10-2006-0064723

(51) Int. Cl.
*G10L 21/00* (2013.01)
*G10L 19/12* (2013.01)
*G10L 19/10* (2013.01)
*G10L 19/107* (2013.01)

(52) U.S. Cl.
CPC .............. *G10L 19/12* (2013.01); *G10L 19/10* (2013.01); *G10L 19/107* (2013.01)
USPC .......................................... 704/223; 704/230

(58) Field of Classification Search
CPC .................... G10L 19/12; G10L 19/0212

USPC ............... 704/233, 230; 395/228; 375/341
See application file for complete search history.

(56) References Cited

U.S. PATENT DOCUMENTS

| 5,602,961 | A | | 2/1997 | Kolesnik | |
|---|---|---|---|---|---|
| 5,659,659 | A | * | 8/1997 | Kolesnik et al. | 704/219 |
| 5,701,392 | A | | 12/1997 | Adoul et al. | |
| 6,185,173 | B1 | | 2/2001 | Livingston | |
| 6,263,312 | B1 | * | 7/2001 | Kolesnik et al. | 704/500 |
| 6,701,021 | B1 | | 3/2004 | Qian et al. | |
| 7,054,392 | B2 | * | 5/2006 | Chappaz | 375/341 |

(Continued)

OTHER PUBLICATIONS

PCT Search Report dated Oct. 19, 2006 issued in PCT/KR2006/002761.

(Continued)

*Primary Examiner* — Talivaldis Ivars Smits
*Assistant Examiner* — Farzad Kazeminezhad
(74) *Attorney, Agent, or Firm* — Stanizone & Kim, LLP

(57) ABSTRACT

A method and apparatus to search a codebook including pulses that model a predetermined component of a speech signal. The method includes the operations of selecting a predetermined number of paths corresponding to a predetermined number of pulse locations that are most consistent with the predetermined component, from among paths corresponding to pulse locations of a predetermined pulse location set allocated to at least one branch that connects one state of a predetermined Trellis structure to another state, performing the path selecting operation on each of states other than the one state, and selecting a path corresponding to pulse locations that are most consistent with the predetermined component from among paths including the selected paths, wherein each path corresponds to a union of plural tracks of an algebraic codebook. Accordingly, a number of calculations required during a codebook search is reduced.

16 Claims, 10 Drawing Sheets

(56) References Cited

U.S. PATENT DOCUMENTS

| | | | |
|---|---|---|---|
| 7,110,948 B1 * | 9/2006 | Mekuria | 704/242 |
| 2002/0126775 A1 | 9/2002 | Chappaz | |
| 2004/0230429 A1 * | 11/2004 | Son et al. | 704/230 |

OTHER PUBLICATIONS

Japanese Office Action issued Aug. 24, 2010 in JP Application No. 200680025725.

* cited by examiner

METHOD AND APPARATUS TO SEARCH FIXED CODEBOOK USING TRACKS OF A TRELLIS STRUCTURE WITH EACH TRACK BEING A UNION OF TRACKS OF AN ALGEBRAIC CODEBOOK

CROSS-REFERENCE TO RELATED APPLICATIONS

This application claims priority under 35 U.S.C. §119(a) of Korean Patent Application No. 10-2005-0063267, filed on Jul. 13, 2005, and No. 10-2006-0064723, filed on Jul. 11, 2006 in the Korean Intellectual Property Office, the disclosure of which is incorporated herein in its entirety by reference.

BACKGROUND OF THE INVENTION

1. Field of the Invention

The present general inventive concept relates to a method and apparatus of searching a codebook, and more particularly, to a method and apparatus to search a codebook including pulses that model a predetermined component included in a speech signal.

2. Description of the Related Art

A vocoder technique that encodes a voice using a compression/decompression technique is important in the application field of information technology, such as, mobile and satellite communications, multimedia communications, personal portable communications, and Internet phones. There are various types of vocoders. Code excited linear predictive (CELP) coding based on an analysis-by-synthesis structure is the most prevalently used in multimedia and wireless communications systems. In CELP coding, a residual signal of a vocal tract and characteristics of a glottis (i.e., a space between vocal cords or folds) are modeled by an adaptive codebook and a fixed codebook. CELP coding is implemented with different degrees of complexity and provides different qualities of synthesized sounds according to structures of the codebooks and searching processes thereof. Hence, a variety of implementations of CELP coding and associated CELP variations have been proposed.

As an example of the CELP, there is an algebraic CELP (ACELP) coding method to obtain a code vector which uses a simple algebraic method. An ACELP coding method is based on an algebraic sign structure including a combination of several amplitude (+1/−1) pulses for each frame and uses a limited number of amplitude pulses in a codebook. Accordingly, the ACELP coding method performs well in a presence of channel noise. A method of searching for a code vector using the ACLEP coding method is referred to as a fixed codebook search.

An adaptive multi-rate (AMR) wideband speech coder, which is selected as a wideband speech coder standard in an international consortium called 3rd Generation Partnership Program (3GPP), has 9 fixed bitrate transmission modes, namely, 23.85 kbps, 23.05 kbps, 19.85 kbps, 18.25 kbps, 15.85 kbps, 14.25 kbps, 12.65 kbps, 8.85 kbps, and 6.60 kbps. A fixed codebook search is based on an algebraic codebook structure and is implemented in different ways depending on different transmission modes.

FIG. 1 is a flowchart illustrating a fixed codebook searching method applied to a 8.85 kbps mode of an AMR wideband speech coder. The fixed codebook searching method of FIG. 1 is based on an algebraic codebook. A fixed codebook $c_k$ that minimizes a mean squared error (MSE) of a target signal is the same as a fixed codebook that maximizes the following Equation 1:

$$Q_k = \frac{(x_2^t H c_k)^2}{c_k^t H^t H c_k} = \frac{(d^t c_k)^2}{c_k^t \Phi c_k} \qquad (1)$$

wherein $d^t$ denotes a correlation between the target signal and an impulse response $h(n)$, and $\phi$ denotes a correlation of the impulse response $h(n)$. When each subframe is comprised of M samples, $d(n)$ and $\phi(i,j)$ are calculated by the following Equations 2 and 3, respectively:

$$d(n) = \sum_{i=n}^{M-1} x_2(i) h(i-n), \quad i = 0, \ldots, M \qquad (2)$$

$$\Phi(i, j) = \sum_{n=j}^{M-1} h(n-i) h(n-j), \quad i = 0, \ldots, M, \quad j = i, \ldots, M \qquad (3)$$

The algebraic codebook of the 8.85 kbps mode of the AMR wideband speech coder has a structure as illustrated in Table 1. As illustrated in Table 1, one pulse for each of a total of 4 tracks is searched for, and a total of 20 bits are allocated to locations and signs of found pulses so that each found pulse is encoded.

TABLE 1

| Tracks | Pulses | Locations of pulses |
|---|---|---|
| T1 | i0 | 0, 4, 8, 12, 16, 20, 24, 28, 32, 36, 40, 44, 48, 52, 56, 60 |
| T2 | i1 | 1, 5, 9, 13, 17, 21, 25, 29, 33, 37, 41, 45, 49, 53, 57, 61 |
| T3 | i2 | 2, 6, 10, 14, 18, 22, 26, 30, 34, 38, 42, 46, 50, 54, 58, 62 |
| T4 | i3 | 3, 7, 11, 15, 19, 23, 27, 31, 35, 39, 43, 47, 51, 55, 59, 63 |

The fixed codebook searching method of FIG. 1 will now be described with reference to Table 1. The fixed codebook $c_k$ includes only four vectors that are not 0, so that a fast codebook search is possible. A correlation of a numerator of Equation 1 and an energy of a denominator thereof are expressed in the following Equations 4 and 5, respectively:

$$C = \sum_{i=0}^{N_p-1} s_i d(m_i) \qquad (4)$$

wherein $m_i$ denotes a location of an i-th pulse, $s_i$ denotes a sign of the i-th pulse, and $N_p$ denotes a number of pulses.

$$E = \sum_{i=0}^{N_p-1} \phi'(m_i, m_i) + 2 \sum_{i=0}^{N_p-2} \sum_{j=i+1}^{N_p-1} \phi'(m_i, m_j) \qquad (5)$$

Referring to FIG. 1, in operation 11, Equations 4 and 5 are previously calculated so that a fast codebook search is possible. In addition, a value $b(n)$ used when pulse candidate vectors which reduce a number of calculations are selected is calculated by the following Equation 6:

$$b(n) = \sqrt{\frac{E_d}{E_r}} r_{LTP}(n) + ad(n) \qquad (6)$$

wherein $E_d$ denotes an energy of a correlation d(n), $r_{LTP}(n)$ denotes a residual signal generated after pitch prediction, and $E_r$ denotes an energy of a residual signal $r_{LTP}(n)$.

In operation 12, candidate vectors of pulse locations of first and third tracks are selected using a value b(n) previously calculated in operation 11.

In sub-operations 13a, 13b, and 13c of operation 13, optimal locations of two pulses that maximize the value of Equation 1 are searched for from two overlapped loops that use a track t to which vector candidates belong and a track (t+1) next to the track t. With the found two pulses fixed, optimal locations of another two pulses that maximize the value of Equation 1 are searched for from two overlapped loops that use a track (t+2) to which the vector candidates belong and a track (t+3) next to the track (t+2). In sub-operations 13d through 13f of operation 13, sub-operations 13a through 13c are repeated four times, and finally four optimal pulse locations and optimal pulse signs that maximize the value of Equation 1 are determined from results of an execution of four iterations of sub-operations 13a through 13c. As described above, the fixed codebook searching method of FIG. 1 is implemented in such a manner that several candidate pulses are selected from pulses of a track according to a correlation value, and a next track is then searched. Thus, the fixed codebook searching method of FIG. 1 provides a reduction in a number of required calculations as compared with a method of searching all of the tracks simultaneously. However, even the reduced number of required calculations is considered somewhat large in light of a sound quality produced by the fixed codebook searching method of FIG. 1.

SUMMARY OF THE INVENTION

The present general inventive concept provides a codebook searching method that includes a reduced number of calculations and produces improved-quality sounds compared with a conventional codebook searching method, and a codebook searching apparatus that performs the codebook searching method.

The present general inventive concept also provides a computer readable recording medium that records a computer program to execute the codebook searching method.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a method of searching a codebook including pulses that model a predetermined component of a speech signal, the method including operations of, (a) selecting a predetermined number of paths corresponding to a predetermined number of pulse locations that are most consistent with the predetermined component, from among paths corresponding to pulse locations of a predetermined pulse location set allocated to at least one branch that connects one state of a predetermined Trellis structure to an other state, (b) performing operation (a) on each of states other than the one state, and selecting a path corresponding to pulse locations that are most consistent with the predetermined component, from among paths including the paths selected in operations (a) and (b).

The states on which the operations (a) and (b) are performed may belong to one stage of the predetermined Trellis structure. The method may further include the operation of (d) performing operations (a) and (b) on stages other than the one stage. Operation (c) may include selecting a path corresponding to pulse locations that are most consistent with the predetermined component from among paths including the paths selected in operations (a), (b), and (d).

The predetermined component may be a signal obtained by filtering a speech signal with use of a linear prediction encoding method and removing a pitch component from the speech signal.

Operation (d) may include performing operations (a) and (b) on the stages of the predetermined Trellis structure in an order from a first stage to a last stage.

The Trellis structure may be constructed such that different pulse location sets are allocated to stages, pulse location sets into which a pulse location set allocated to one stage is divided may be allocated to branches of the one stage, and pulse location sets into which a pulse location set allocated to another stage is divided may be allocated to branches of the another stage.

At least one of the pulse location sets allocated to the stages may be a union of a plurality of sets each having exclusive pulse locations.

The method further may include an operation of restricting a number of initial states of the predetermined Trellis structure to a first number and restricting a number of last states corresponding to the restricted initial states to a second number.

Operation (d) may include performing operations (a) and (b) on a first stage to a predetermined number-th stage of the Trellis structure in sequence. The method further may include operations of, (e) ascertaining initial states corresponding to one of the states of the predetermined number-th stage by tracking paths starting from the one state of the predetermined number-th stage based on the paths selected in operations (a), (b), and (d), and determining paths ranging from the one state of the predetermined number-th stage to last states, the number of which is restricted to the second number, (f) performing operation (e) on each of states of the predetermined number-th stage other than the one state of the predetermined number-th stage, and (g) performing operations (a) and (b) on the states on the paths determined in operations (e) and (f). Operation (c) may include selecting paths corresponding to pulse locations that are most consistent with the predetermined component from among paths including the paths selected in operations (a), (b), (d), and (g).

The Trellis structure may include N (=$2^v$, where v denote an integer) states and L stages, the first number is $2^w$ ($0 \le w \le v$) and the second number is $2^{v-w}$, and the predetermined number-th stage is a L−$\log_2$ N-th stage.

The foregoing and/or other aspects of the present general inventive concept may also be achieved by providing a method of searching a codebook including pulses that model a predetermined component of a speech signal, the method including operations of, (a) selecting a path corresponding to a pulse location combination most consistent with the predetermined component, from among paths corresponding to pulse location combinations of predetermined pulse location sets allocated to a plurality of branches that connect one state of a last stage of one stage group of stage groups of a Trellis structure to states of a first stage of the one stage group, wherein the stage groups are obtained by grouping stages of the Trellis structure in a predetermined number, (b) performing operation (a) on each of the states other than the one state of the last stage, (c) performing operations (a) and (b) on stage groups other than the one stage group, and (d) selecting a path corresponding to pulse locations that are most consistent with the predetermined component, from among paths including the paths selected in operations (a), (b), and (c).

The predetermined component may be a signal obtained by filtering a speech signal with use of a linear prediction encoding method and removing a pitch component from the speech signal.

Operation (c) may include performing operations (a) and (b) on the stage groups of the Trellis structure in an order from a first stage group to a last stage group.

The Trellis structure may be constructed such that different pulse location sets are allocated to the stages, pulse location sets into which a pulse location set allocated to one stage is divided may be allocated to branches of the one stage, and pulse location sets into which a pulse location set allocated to another stage is divided may be allocated to branches of another stage.

At least one of the pulse location sets allocated to the stages may be a union of a plurality of sets each having exclusive pulse locations.

The method further may include an operation of restricting a number of initial states of the Trellis structure to a first number and restricting a number of last states corresponding to the restricted initial states to a second number.

Operation (c) may include performing operations (a) and (b) on a first stage group to a predetermined number-th stage group of the Trellis structure in a sequence. The method further may include the operations of: (e) ascertaining initial states corresponding to one of the states of the last stage of the predetermined number-th stage group by back tracking paths starting from the one state of the last stage based on the paths selected in operations (a), (b), and (c), and determining paths ranging from the one state of the last stage to last states the number of which is restricted to the second number; (f) performing operation (e) on each of states of the last stage of the predetermined number-th stage group that are other than the one state of the last stage of the predetermined number-th stage group; and (g) performing operations (a) and (b) on the states on paths determined in operations (e) and (f). Operation (d) includes selecting a path corresponding to pulse locations most consistent with the predetermined component from among paths including the paths selected in operations (a), (b), (c), and (g).

The Trellis structure may include N ($=2^v$, where v denote an integer) states and L stages, the first number may be $2^w$ ($0 \leq w \leq v$) and the second number may be $2^{v-w}$, and the predetermined number-th stage may be a L–$\log_2$ N-th stage.

The foregoing and/or other aspects of the present general inventive concept may also be achieved by providing an apparatus for searching a codebook including pulses that model a predetermined component of a speech signal, the apparatus including a Trellis structure database storing a predetermined Trellis structure, a selection unit selecting a predetermined number of paths corresponding to a predetermined number of pulse locations most consistent with the predetermined component from among paths corresponding to pulse locations of a predetermined pulse location set allocated to at least one branch that connects every state of the Trellis structure to other states, a memory unit storing the predetermined number of pulse locations and the paths, and an output unit outputting information about pulse locations most consistent with the predetermined component and information about paths corresponding to the pulse locations, based on the pulse locations and the paths stored in the memory unit.

The Trellis structure may be constructed such that different pulse locations sets are allocated to stages, pulse location sets into which a pulse location set allocated to one stage is divided may be allocated to branches of the one stage, and pulse location sets into which the pulse location set allocated to another stage is divided may be allocated to branches of the another stage.

The foregoing and/or other aspects of the present general inventive concept may also be achieved by providing a computer readable recording medium which records a method of searching a codebook including pulses that model a predetermined component of a speech signal, the method including operations of, (a) selecting a predetermined number of paths corresponding to a predetermined number of pulse locations that are most consistent with the predetermined component, from among paths corresponding to pulse locations of a predetermined pulse location set allocated to at least one branch that connects one state of a predetermined Trellis structure to another state, (b) performing operation (a) on each of states other than the one state, and (c) selecting a path corresponding to pulse locations that are most consistent with the predetermined component, from among paths including the paths selected in operations (a) and (b).

The foregoing and/or other aspects of the present general inventive concept may also be achieved by providing a device to search a codebook including pulses that model a predetermined component of a speech signal including a memory unit including a Trellis structure database to store a predetermined Trellis structure and a predetermined number of pulse locations and Trellis paths corresponding to pulse locations of a predetermined pulse location set allocated to states of the predetermined Trellis structure, a calculation unit to receive the predetermined component of the speech signal and the predetermined Trellis structure, to calculate predetermined equation values, and to output calculation results, a selection unit in communication with the calculation unit and the memory unit to select a predetermined number of Trellis paths corresponding to a predetermined number of pulse locations which are most consistent with the predetermined component, and an output unit to output information about pulse locations and corresponding Trellis paths which are most consistent with the predetermined component based on the predetermined number of pulse locations and the Trellis paths stored in the memory.

The foregoing and/or other aspects of the present general inventive concept may also be achieved by providing a codebook decoding device to restore a predetermined component of a speech signal modeled on pulses including a Trellis structure database to store a predetermined Trellis structure and a predetermined number of pulse locations and Trellis paths corresponding to pulse locations of a predetermined pulse location set allocated to states of the predetermined Trellis structure, a codebook decoding unit to receive information about pulse locations and corresponding Trellis paths and to restore the predetermined component based on the predetermined number of pulse locations and the Trellis paths stored in the memory, and based on a selection of a predetermined number of Trellis paths corresponding to a predetermined number of pulse locations which are most consistent with the predetermined component from among paths corresponding to pulse locations of a predetermined pulse location set allocated to at least one branch that connects every state of the predetermined Trellis structure to other states, and an output unit to output the restored predetermined component of the decoding unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
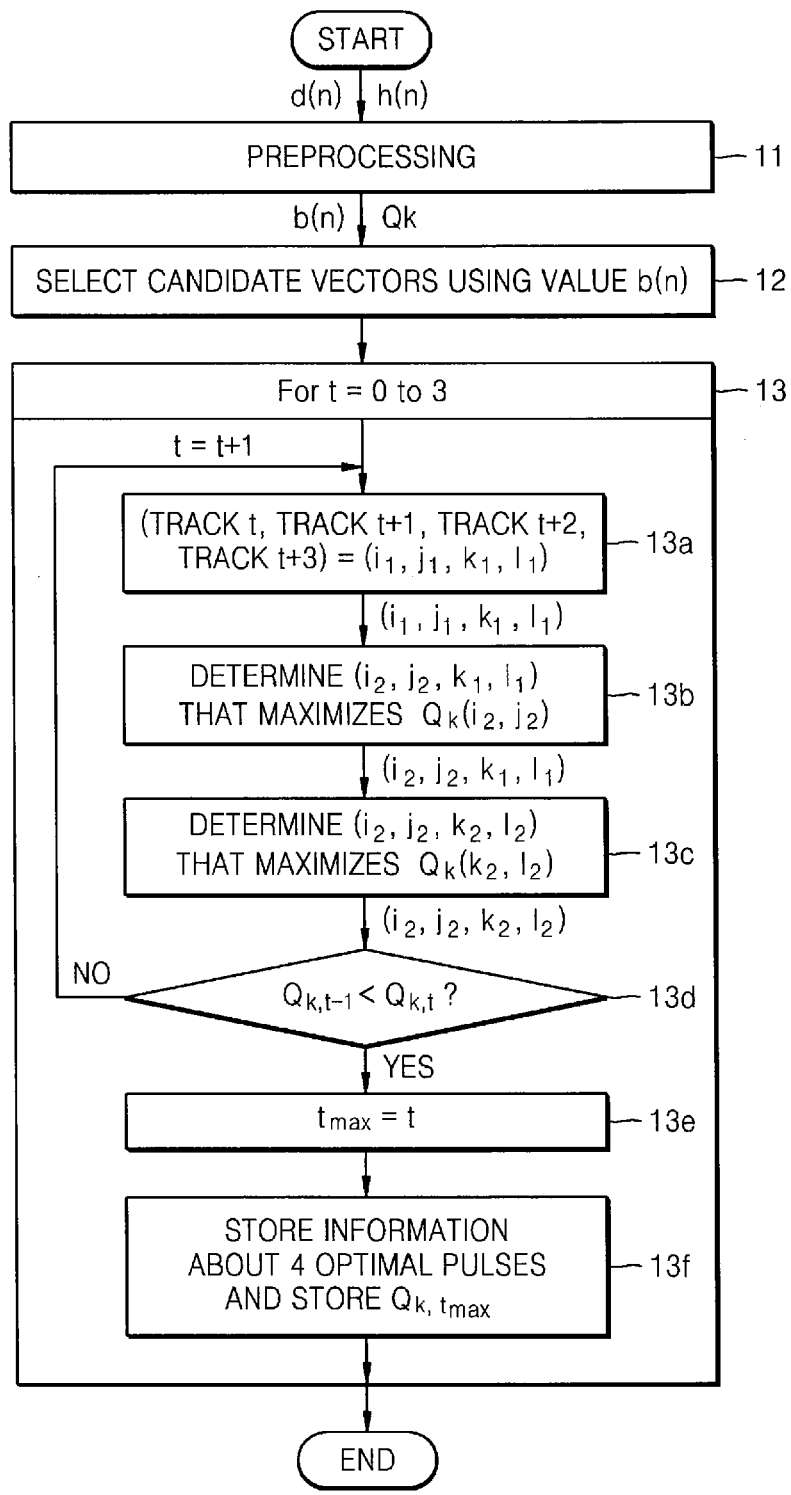
FIG. 1 is a flowchart illustrating a fixed codebook searching method applied to a 8.85 kbps mode of an adaptive multi-rate (AMR) wideband speech coder.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A block constrained Trellis coded quantization (BC-TCQ) algorithm uses an N (which is equal to $2^v$, where v denotes a number of bits allocated to each sample) Trellis structure based on an encoder structure having ½-rate convolutional encoders and no feedbacks. As preconditions of the BC-TCQ algorithm, a number of initial states of selectable Trellis paths is limited to 2w ($0 \leq w \leq v$) from among a total of N states, and a number of states on a last stage is limited to 2w ($0 \leq w \leq v$) from among the N states so as to conform to the initial states of the selectable Trellis paths.

In a process of performing single Viterbi encoding using the BC-TCQ algorithm, first, the initial states of N survival paths determined under initial state preconditions are referred to from a first stage to a L–$\log_2$ N-th stage (where L denotes a total number of stages, and N denotes a total number of Trellis states). Then, only Trellis paths that allow one of the $2^{v-w}$ states determined according to each of the initial states to be selected as the state of the last stage are considered in remaining v stages. The best Trellis path is selected from all considered Trellis paths and transmitted.

Figure 2:
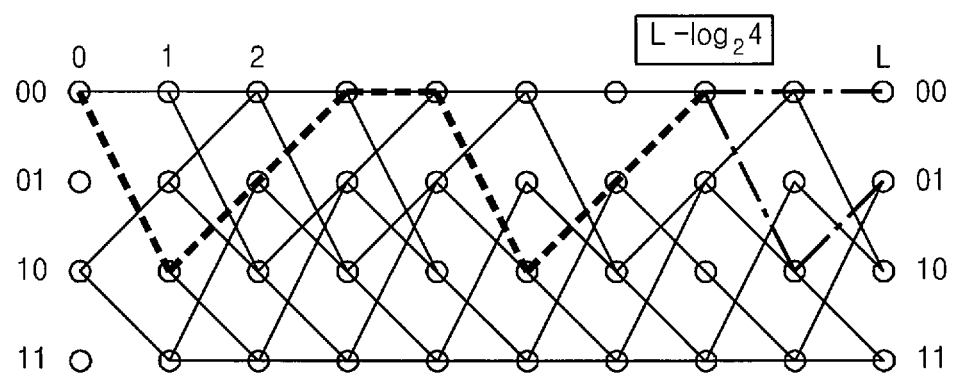
FIG. 2 illustrates Trellis paths considered when a block constrained Trellis coded quantization (BC-TCQ) algorithm is applied to a 4-state Trellis structure.

FIG. 2 illustrates Trellis paths that are considered when a BT-TCQ algorithm where w is 1 is applied to a 4-state Trellis structure. The initial state of a selectable Trellis path is 00 or 10 among four states. The state of the last stage of the selectable Trellis path is set to 00 or 01 when the initial state is 00, and 10 or 11 when the initial state is 10. Referring to FIG. 2, a survival path (which is represented by a thick dotted line) whose state is determined until the L–$\log_2$ N-th stage to be '00' has an initial state of '00', and thus two Trellis paths selectable on the remaining stages have the states '00' and '01' on the last stage and are represented by thick one-dot-dashed lines.

Figure 3:
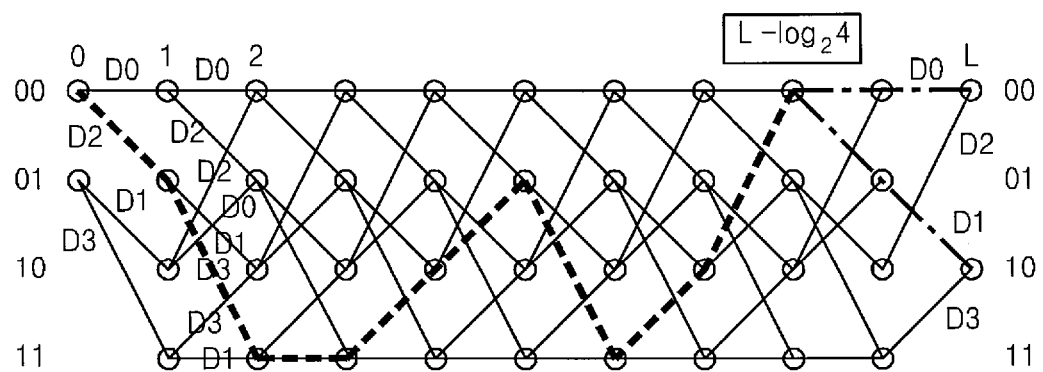
FIG. 3 illustrates an encoding process when an algebraic Trellis coding (ATC) algorithm is used in the 4-state Trellis structure of FIG. 2.

Like the BC-TCQ algorithm, an algebraic Trellis coding (ATC) algorithm of the present general inventive concept illustrated in FIG. 3 is based on an N (which is equal to $2^v$, where v denotes a number of bits allocated to each sample) Trellis structure that is based on an encoder structure having ½-rate convolutional encoders and no feedbacks. Hence, like preconditions for the BC-TCQ algorithm, a number of initial states of selectable Trellis paths is limited to $2^w$ ($0 \leq w \leq v$) from among a total of N states, and a number of states on a last stage is limited to $2^{v-w}$ ($0 \leq w \leq v$) according to a limited number of initial states of the selectable Trellis paths.

A simple example of list Viterbi encoding using an ATC algorithm in which w is 1 will now be described.

First, a list Viterbi algorithm is executed on each of the limited number of initial states from a first stage to the L–$\log_2$ N-th stage. In this operation, k optimal paths are stored for each of the states from the first stage to the L–$\log_2$ N-th stage. Then, k optimal survival paths are determined and ranked in each of the states of the L–$\log_2$ N-th stage, based on the stored k optimal paths. Here, k denotes a number of list Viterbi paths. The k optimal survival paths are referred to as survival list paths.

The initial states of N×k survival list paths in the L–$\log_2$ N-th stage are ascertained by path backtracking. Trellis list paths having a limited number of states on the last stage are considered by referring to ascertained initial stages. Finally, a best Trellis list path is selected from among the Trellis list paths considered from the L–$\log_2$ N-th stage to an L-th stage, and the best Trellis path is selected from among N survival list paths. Information about the selected best Trellis path is transmitted.

FIG. 3 illustrates Trellis paths that are considered in a list Viterbi encoding process when an ATC algorithm is used in the 4-state Trellis structure. In FIG. 3, the initial state of a selectable Trellis path is 00 or 01 among four states 00, 01, 10 and 11. The state of the last stage of the selectable Trellis path is 00 or 10 when the initial state is 00, and 01 or 11 when the initial state is 01. List paths ranked by a list Viterbi algorithm exist on each state. Referring to FIG. 3, a survival list path that has a state '00' on the L–$\log_2$N-th stage and is represented by a thick dotted line has an initial stage of '00', and thus two Trellis paths selectable on the remaining stages have states '00' and '10' on the last stage and are represented by thick one-dot-dashed lines.

Table 2 illustrates an extended codebook according to an embodiment of the present general inventive concept that is obtained by extending a fixed codebook for a 8.85 kbps mode of an adaptive multi-rate (AMR) wideband speech encoder.

TABLE 2

| Extended codebook | Algebraic codebook |
|---|---|
| V1 | T1 U T2 |
| V2 | T2 U T3 |
| V3 | T3 U T4 |
| V4 | T4 U T1 |

An extended codebook according to the present general inventive concept includes extended tracks that are unions of a plurality of sets each having exclusive pulse locations. More specifically, referring to Table 2, extended tracks V1 through V4 of the extended codebook are each obtained by uniting pulse location sets of two tracks of an algebraic codebook. Table 3 illustrates sub-codebooks that are allocated to branches of a Trellis structure based on the extended codebook of Table 2.

TABLE 3

| Sub-codebook | First stage (V1) | Second stage (V2) |
|---|---|---|
| D0 | 0, 8, 16, 24, 32, 40, 48, 56 | 1, 9, 17, 25, 33, 41, 49, 57 |
| D1 | 1, 9, 17, 25, 33, 41, 49, 57 | 2, 10, 18, 26, 34, 42, 50, 58 |
| D2 | 4, 12, 20, 28, 36, 44, 52, 60 | 5, 13, 21, 29, 37, 45, 53, 61 |
| D3 | 5, 13, 21, 29, 37, 45, 53, 61 | 6, 14, 22, 30, 38, 46, 54, 62 |

| Sub-codebook | Third stage (V3) | Fourth stage (V4) |
|---|---|---|
| D0 | 2, 10, 18, 26, 34, 42, 50, 58 | 3, 11, 19, 27, 35, 43, 51, 59 |
| D1 | 3, 11, 19, 27, 35, 43, 51, 59 | 4, 12, 20, 28, 36, 44, 52, 60 |
| D2 | 6, 14, 22, 30, 38, 46, 54, 62 | 7, 15, 23, 31, 39, 47, 55, 63 |
| D3 | 7, 15, 23, 31, 39, 47, 55, 63 | 0, 8, 16, 24, 32, 40, 48, 56 |

In an existing algebraic codebook illustrated in Table 1, exclusive pulse locations are allocated to each track. In the extended codebook illustrated in Table 3, each extended track has 32 pulse locations by summing two tracks each having 16 pulse locations. Hence, a number of pulse location combinations possibly existing in the extended codebook is greater than the number of pulse location combinations possibly existing in the existing algebraic codebook, so that it can be theoretically concluded that a better quality sound can be produced when the extended codebook is used as opposed to when the existing algebraic codebook is used.

Referring to Table 3, a single extended track is allocated to each stage by applying the extended codebook to the Trellis structure, and a single pulse is searched for from each extended track. Accordingly, the number of pulse locations to be considered to search for a single pulse is 32, which is twice the number of pulse locations to be considered in the existing algebraic codebook. Each extended track is divided into four sub-codebooks, which are divided and allocated to the branches of the Trellis structure using an interleaving method as illustrated in FIG. 3.

Figure 4:
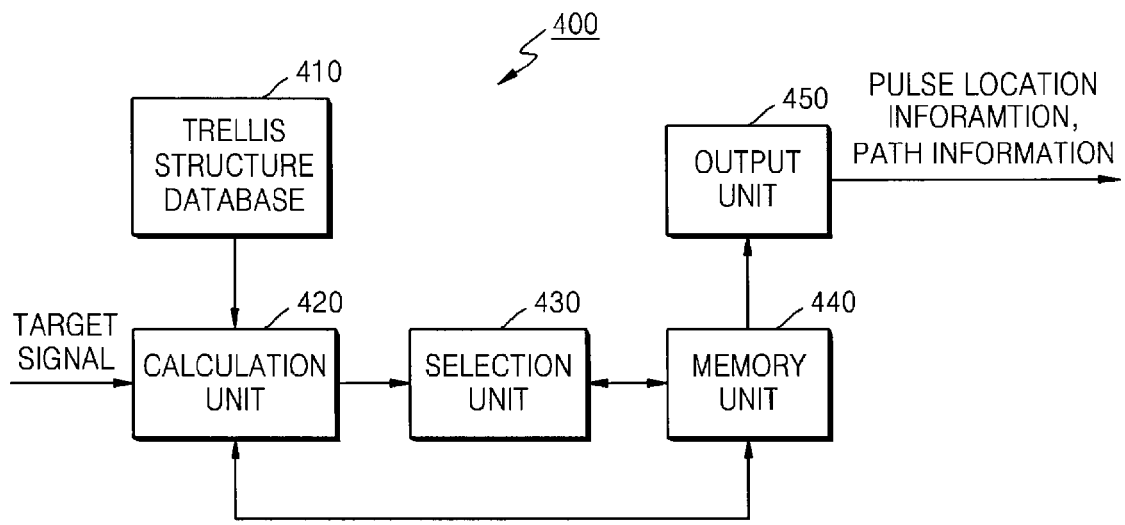
FIG. 4 is a block diagram illustrating a codebook searching apparatus according to an embodiment of the present general inventive concept.

FIG. 4 is a block diagram of a codebook searching apparatus 400 according to an embodiment of the present general inventive concept. Referring to FIG. 4, the codebook searching apparatus 400 includes a Trellis structure database 410, a calculation unit 420, a selection unit 430, a memory unit 440, and an output unit 450.

The Trellis structure database 410 stores a predetermined Trellis structure.

In the Trellis structure stored in the Trellis structure database 410, a predetermined pulse set is allocated to each stage, and subclasses of the predetermined pulse set are allocated to each branch. For example, as illustrated in Table 1, the Trellis structure stored in the Trellis structure database 410 is constructed such that an extended track is allocated to each stage of the Trellis structure and sub-codebooks are allocated to each branch of the Trellis structure.

The calculation unit 420 receives a predetermined component included in a speech signal, namely, a target signal for codebook search, calculates predetermined equation values by using the Trellis structure and the pulse location sets allocated to the Trellis structure, which are stored in the Trellis structure database 410, and outputs the predetermined equation values.

The predetermined component may be a signal obtained by filtering a speech signal using linear prediction encoding and removing a pitch component from the speech signal.

The selection unit 430 selects a predetermined number of paths corresponding to a predetermined number of pulse locations which are most consistent with the target signal from among paths corresponding to the pulse locations of a predetermined pulse location set allocated to at least one branch that connects every state of the Trellis structure to the other states, based on the equation values output by the calculation unit 420.

The memory unit 440 stores the predetermined number of pulse locations and the paths. The Trellis structure database 410 may be included in the memory unit 440.

The output unit 450 outputs information about pulse locations which are most consistent with the target signal and information about paths corresponding to the pulse locations, based on the pulse locations and the paths stored in the memory unit 440.

Figure 5:
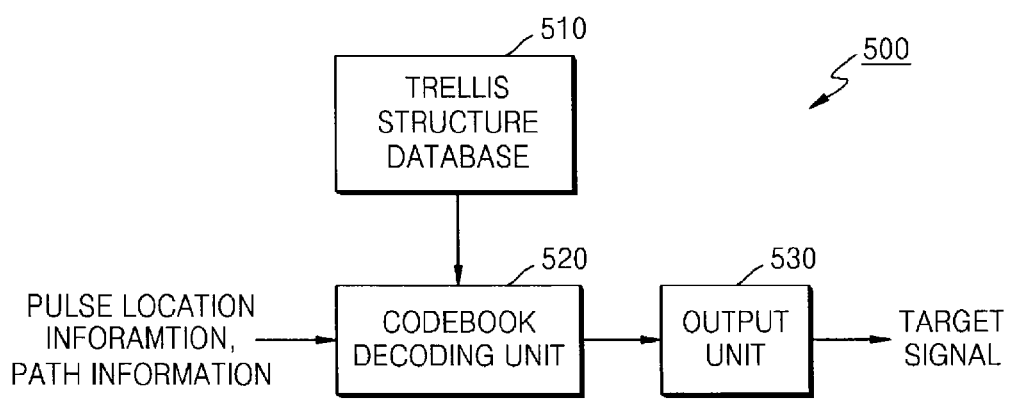
FIG. 5 is a block diagram illustrating a codebook decoding apparatus according to an embodiment of the present general inventive concept.

FIG. 5 is a block diagram of a codebook decoding apparatus 500 according to an embodiment of the present general inventive concept. Referring to FIG. 5, the codebook decoding apparatus 500 includes a Trellis structure database 510, a codebook decoding unit 520, and an output unit 530.

The Trellis structure database 510 stores the Trellis structure stored in the Trellis structure database 410 of the codebook searching apparatus 400 and the same information as the information about the pulse locations allocated to the Trellis structure as stored in memory unit 440.

The codebook decoding unit 520 restores the predetermined component included in the speech signal by using the information stored in the Trellis structure database 510 and the pulse location information and path information output by the codebook searching apparatus 400.

The output unit 530 outputs the restored predetermined component.

FIGS. 6 through 9 illustrate a codebook searching method according to an embodiment of the present general inventive concept.

Figure 6:
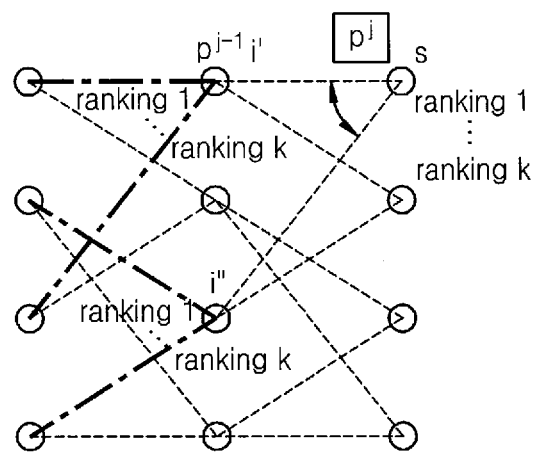
FIG. 6 illustrates list Viterbi encoding performed in a predetermined stage of a Trellis structure.
Figure 7:
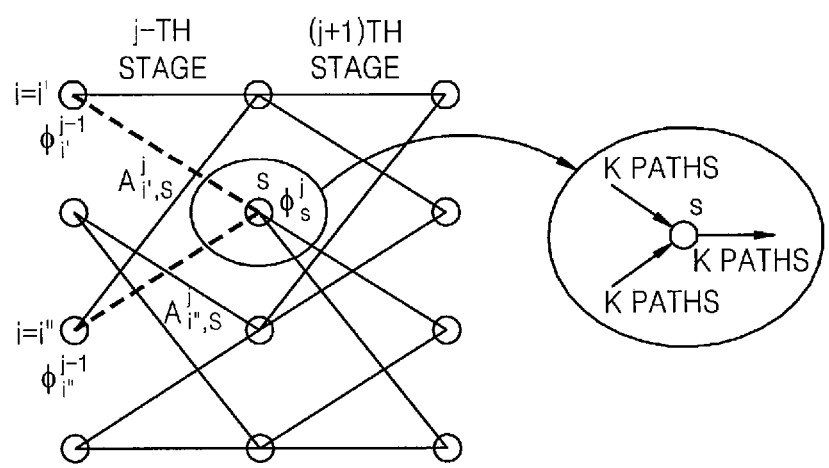
FIG. 7 illustrates a path list determination performed in a predetermined stage of a Trellis structure by using a predetermined equation value.

FIG. 6 illustrates list Viterbi encoding performed in a predetermined stage of a Trellis structure. FIG. 7 illustrates a path list determination performed in a predetermined stage of a Trellis structure by using a predetermined equation value.

Figure 8:
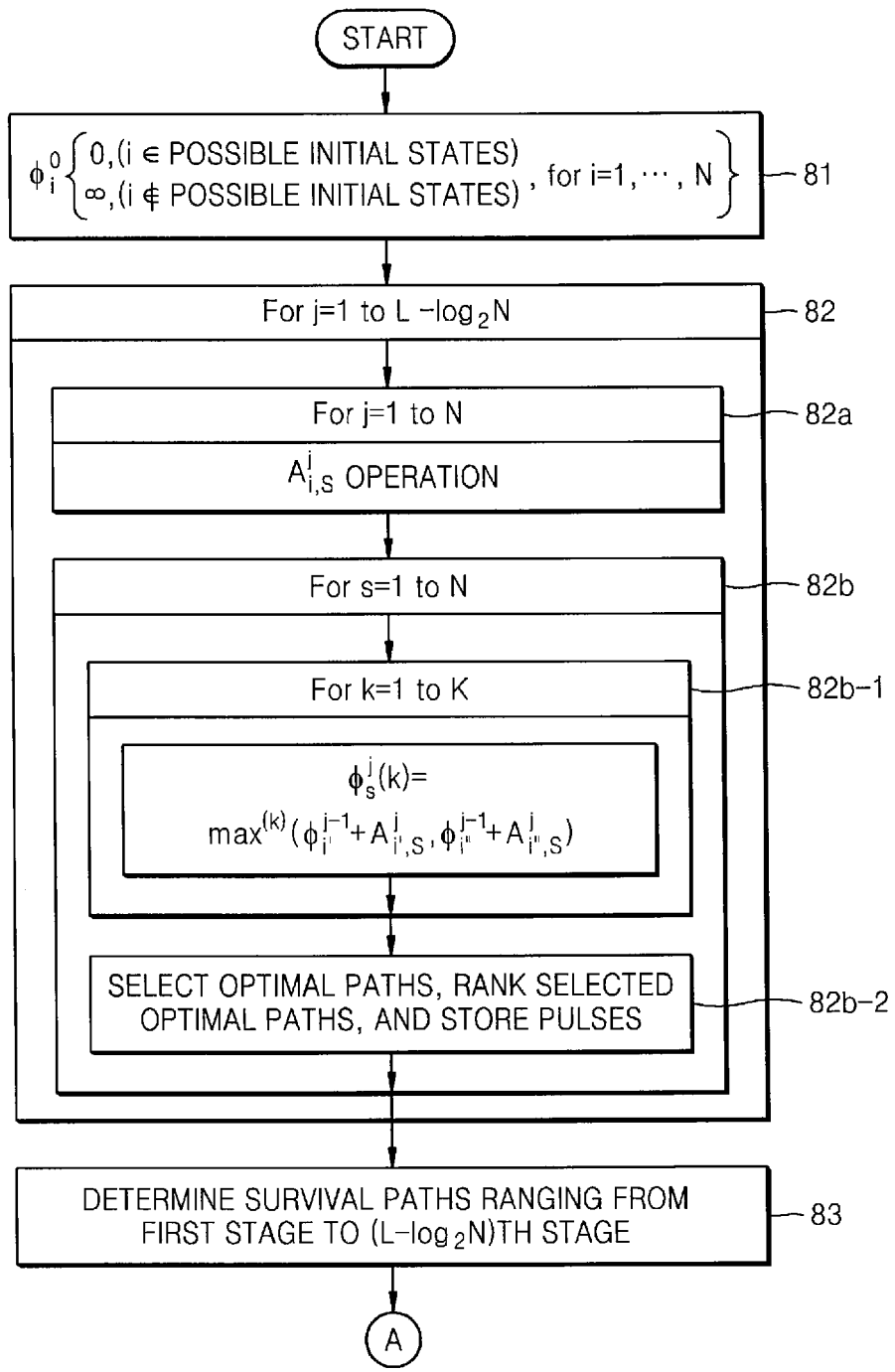
FIGS. 8 and 9 are flowcharts illustrating a codebook searching method according to an embodiment of the present general inventive concept.
Figure 9:
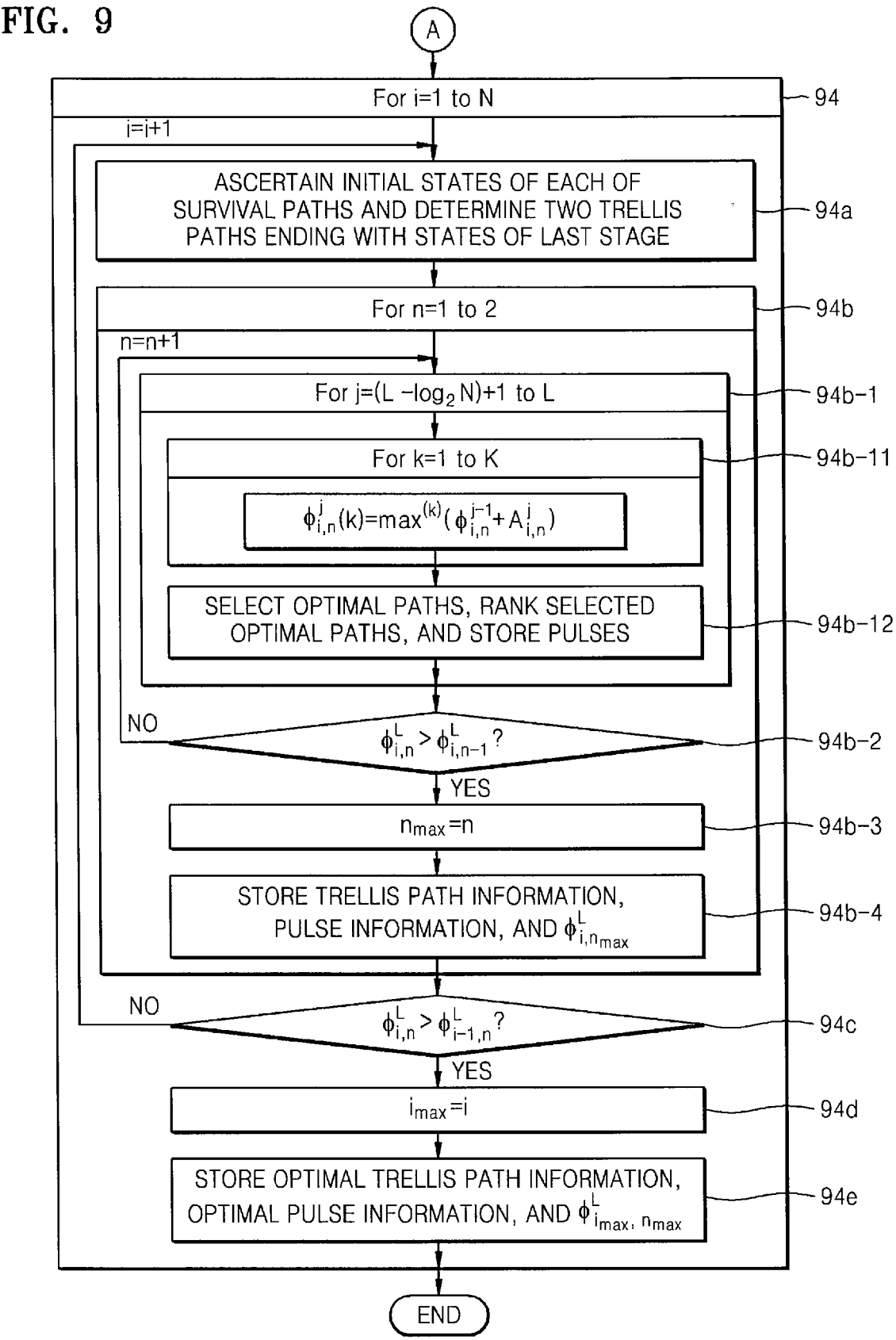

FIGS. 8 and 9 are flowcharts illustrating a codebook searching method according to an embodiment of the present general inventive concept.

First, in the list Viterbi encoding in a j-th stage of FIG. 6, pulse location information associated with a state s of the j-th stage varies according to a state of a previous stage. Pulse location information also varies according to optimal paths that are ranked and stored in a previous state.

FIG. 7 illustrates a path list determination in a predetermined stage (e.g., a j-th stage) of a Trellis structure using a predetermined equation value $\phi_s^j$. (FIG. 7 is being explained more in detail by "sub-operation 82$b$-1 and 82$b$-2 in paragraphs [0084] and [0085])

Referring to FIG. 8, in operation 81, the codebook searching apparatus 400 performs initialization with respect to a maximum value $\phi_i^0$ of a predetermined equation that is used to achieve optimal pulse search in a limited number of initial states among a total of N states of a zero-th stage.

Then, in operation 82, list Viterbi encoding is performed on each of the initial states from a first stage to an L–$\log_2$ N-th stage (where L denotes a total number of stages) as illustrated in FIGS. 6 and 7. More specifically, in sub-operation 82a of operation 82, the codebook searching apparatus 400 calculates a value of Equation 7, which is a modification of Equation 1, using a sub-codebook allocated to a branch connecting a state j of a previous stage to a state s of a current stage. Equation 7 for each branch may be expressed as the following Equations 8 and 9:

$$A_q = \frac{C_q^2}{E_q} = \frac{(d_q^T c_q)^2}{c_q^T \Phi c_q} \tag{7}$$

wherein Cq denotes a q-th fixed codebook vector, and T denotes a transpose.

$$A_{i',s} = \max\left(\frac{(d_{i',s}^T c_{i',s})^2}{c_{i',s}^T \Phi c_{i',s}} \,\bigg|\, c_{i',s} \in D_{i',s}^j\right) \tag{8}$$

$$A_{i'',s} = \max\left(\frac{(d_{i'',s}^T c_{i'',s})^2}{c_{i'',s}^T \Phi c_{i'',s}} \,\bigg|\, c_{i'',s} \in D_{i'',s}^j\right) \tag{9}$$

In Equations 8 and 9, $D_{i',s}^j$ denotes a sub-codebook allocated to a branch between the state s of the j-th stage and a state i' of a (j-1)th stage, and $D_{i'',s}^j$ denotes a sub-codebook allocated to a branch between the state s of the j-th stage and a state i'' of the (j-1)th stage. $d_{i',s}^T$ denotes a correlation between a target signal and an impulse response h(n) in the sub-codebook allocated to the branch between the state s and the state i'.

In sub-operation 82b of operation 82, a predetermined number of paths corresponding to a predetermined number of pulse locations which are most consistent with a predetermined component of an input signal are selected from among paths corresponding to the pulse locations of a predetermined pulse location set that is allocated to at least one branch that connects every state of a Trellis structure to the other states of the Trellis structure.

More specifically, in sub-operation 82b-1, the codebook searching apparatus 400 updates k values of Equation 11 (following below) by adding the values of Equations 8 and 9 to values $\phi_{i'}^{j-1}$ and $\phi_{i''}^{j-1}$, respectively, of Equation 7 that are each accumulated until a (j-1)th stage of FIG. 7, and stores the k values of Equation 11 in a sequence from a largest value to a smallest value. Because the values of the additions correspond to accumulated values of Equation 7, greater addition values correspond to pulse locations more consistent with the target signal input to the codebook searching apparatus 400 than smaller addition values.

In sub-operation 82b-2, the codebook searching apparatus 400 stores a list of k paths corresponding to the value of Equation 1 among 2k Trellis list paths connected to the state s of the j-th stage of FIG. 7, as in the following Equation 10, and also stores optimal pulse locations and a sequence in which the optimal pulse locations are ranked.

$$\zeta_s^j(k) = \arg\max{}^{(k)}(\phi_{i'}^{j-1} + A_{i',s}^j, \phi_{i''}^{j-1} + A_{i'',s}^j) \tag{10}$$

$$\phi_s^j(k) = \max{}^{(k)}(\phi_{i'}^{j-1} + A_{i',s}^j, \phi_{i''}^{j-1} + A_{i'',s}^j) \tag{11}$$

The codebook searching apparatus 400 repeats operation 82 from the first stage to the L–log$_2$ N-th stage (where L denotes a total number of stages).

In operation 83, the codebook searching apparatus 400 determines N×k survival list paths by path backtracking the optimal list paths obtained from the first stage to the L–log$_2$ N-th stage in operation 82. Because k paths are determined for each of the N states, N×k survival list paths are obtained.

Thereafter, in operation 94 of FIG. 9, list Viterbi encoding are performed on the stages from the stage following the L–log$_2$ N-th stage to the L-th stage, and the best survival list path is selected from the determined survival list paths.

In sub-operation 94a of operation 94, the codebook searching apparatus 400 determines the initial states of the N×k survival list paths determined in operation 83 and determines two Trellis list paths ending with states of the last L-th stage that depend on the initial states.

In operation 94b, list Viterbi encoding is performed in the two Trellis list paths. In operation 94b, n denotes the number (i.e., 2), of last states corresponding to each of the two determined Trellis list paths.

In operation 94b-11, the codebook searching apparatus 400 updates the values of Equation 11 in each state corresponding to the Trellis list paths that range from a (L–log$_2$ N)+1-th stage to the last L-th stage. In other words, the codebook searching apparatus 400 sums a value $\phi_{i,n}^{j-1}$ of Equation 7 accumulated from the (L–log$_2$ N)+1-th stage to the (j-1)th stage and the values $A_{i,n}^j$ of Equation 7 in the two Trellis list paths from the L–log$_2$ N-th stage to the L-th stage, selects k large values from results of the summations, ranks the k large values, and stores the ranked k large values in $\phi_{i,n}^j(k)$. The value $\phi_{i,n}^{j-1}$ of Equation 7 accumulated from the (L–log$_2$ N)+1-th stage to the (j-1)th stage is equal to a value $\phi_{i,n}^{L-log_2}$ N of Equation 11 from the initial stage to the L–log$_2$ N-th stage that is obtained in a state i.

In operation 94b-12, the codebook searching apparatus 400 stores a k path list corresponding to the value $\phi_{i,n}^j(k)$ and also information about optimal pulse locations and the sequence in which the optimal pulse locations are ranked. In operations 94b-2 and 94b-3, the codebook searching apparatus 400 obtains a stage n that maximizes an overall value of Equation 11 obtained in operation 94b-11.

In operation 94b-4, the codebook searching apparatus 400 stores the overall value of Equation 11, Trellis path information, and pulse information.

In operation 94d, the codebook searching apparatus 400 selects a state i that maximizes the value of Equation 11 in the N survival paths, by using the information obtained in operation 94b.

In operation 94e, the codebook searching apparatus 400 stores an optimal overall value of Equation 11, optimal Trellis path information, and optimal pulse information.

FIGS. 10 through 14 are views illustrating a codebook searching method according to another embodiment of the present general inventive concept.

The codebook searching method in the present embodiment is based on the BC-TCQ algorithm. The Trellis structure of the codebook searching method of the present embodiment is similar to that of a first codebook searching method according to the embodiment illustrated in FIGS. 6 through 9. However, an encoding method of the present embodiment is different from the first method in that single Viterbi coding is performed with stages grouped.

Figure 10:
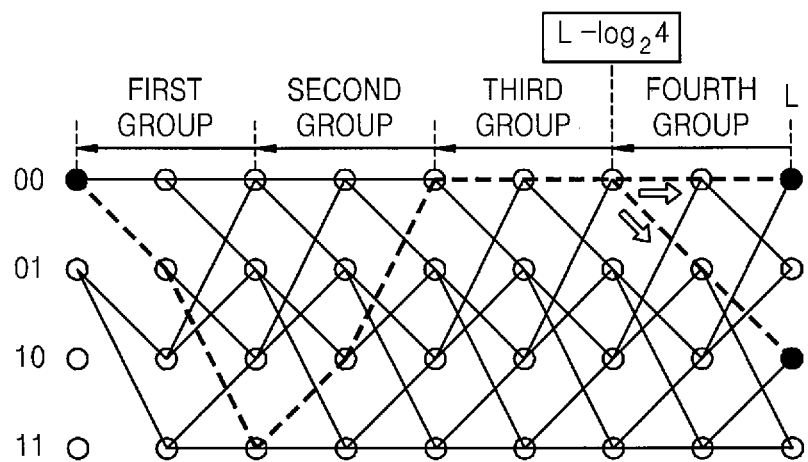
FIG. 10 illustrates Trellis paths considered when an algebraic Trellis coding (ATC) algorithm where stages are grouped in pairs is applied to a 4-state Trellis structure.

FIG. 10 illustrates Trellis paths that are considered when an ATC algorithm where stages are blocked in pairs is applied to a 4-state Trellis structure.

Figure 11:
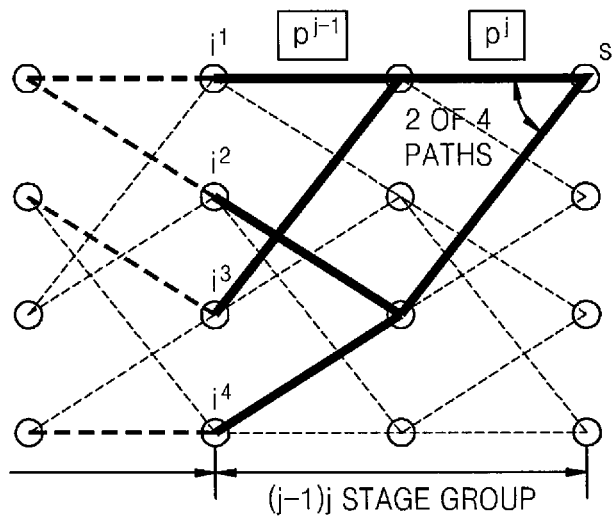
FIG. 11 illustrates single Viterbi encoding performed in a predetermined state of the 4-state Trellis structure of FIG. 10.

FIG. 11 illustrates single Viterbi encoding performed in a predetermined stage of the 4-state Trellis structure of FIG. 10.

Figure 12:
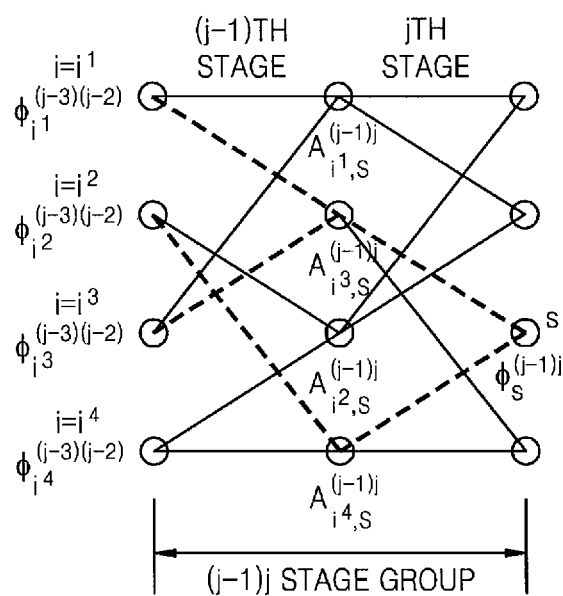
FIG. 12 illustrates a single Viterbi encoding performed in a predetermined state of the 4-state Trellis structure by using a predetermined equation value.

FIG. 12 illustrates a single Viterbi encoding performed in a predetermined stage of the 4-state Trellis structure of FIG. 10 by using predetermined equation value which is described as below in connection with FIGS. 13 and 14.

Figure 13:
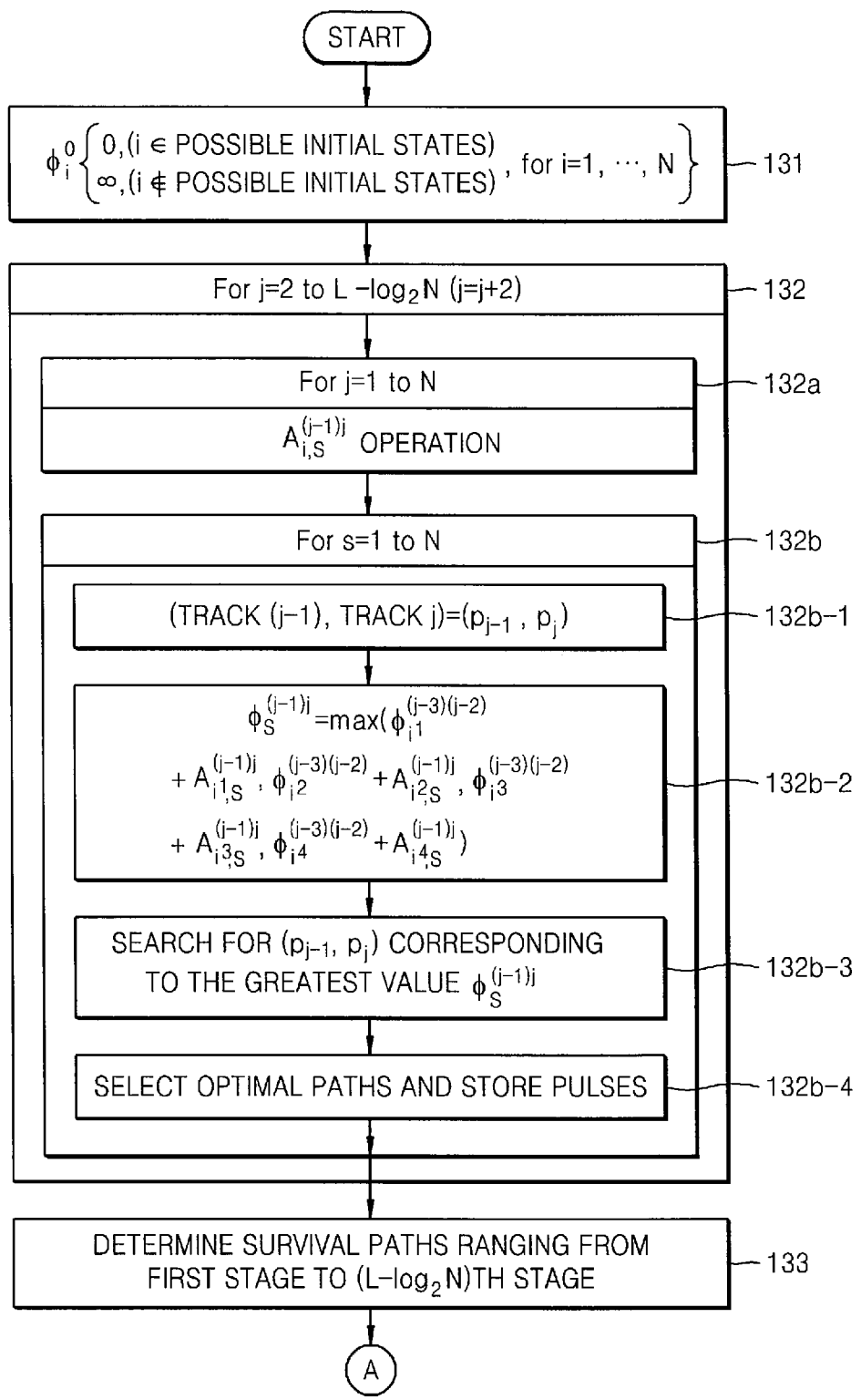
FIGS. 13 and 14 are flowcharts illustrating a codebook searching method according to another embodiment of the present general inventive concept.
Figure 14:
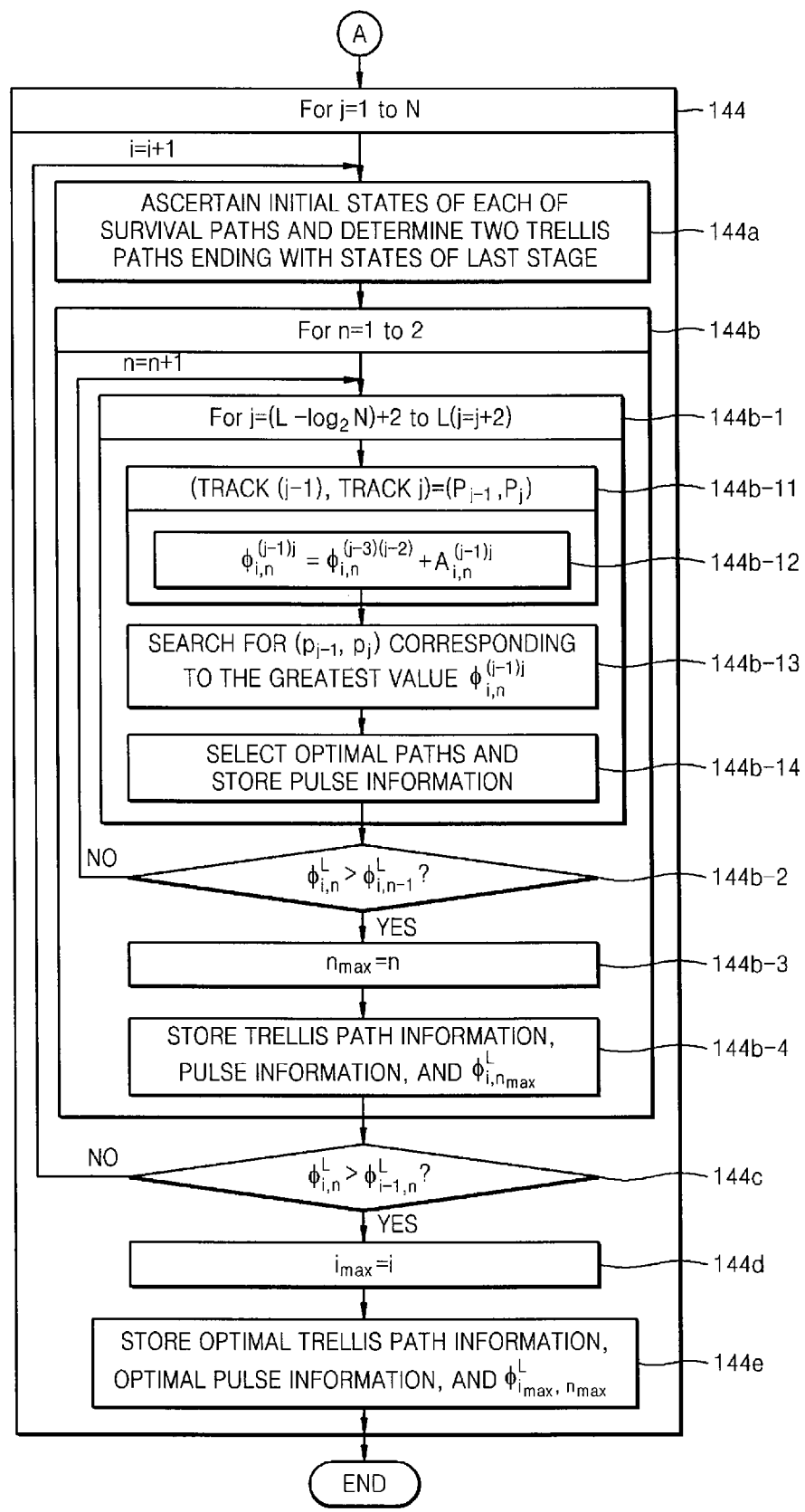

FIGS. 13 and 14 are flowcharts illustrating a codebook searching method according to another embodiment of the present general inventive concept.

A predetermined number of stages of a Trellis structure from a first stage to a L–log$_2$ N-th stage are grouped into stage groups, and a single Viterbi algorithm is performed in each state of the stage groups. Optimal paths are determined in each state by the single Viterbi algorithm. Optimal paths are determined in each of the stage groups, and thus the optimal paths are referred to as optimal group paths. Thereafter, initial states of N survival group paths are determined in the L–log$_2$ N-th stage by path backtracking. Trellis group paths ending with a restricted number of states of a last stage are selected by referring to the determined initial states. Then, a best Trellis group path is selected from the Trellis group paths in the last log$_2$ N stage group. Finally, a best Trellis path is selected from among N survival group paths.

Referring to FIG. 10, similar to FIG. 3, the initial state is '00' or '01', and the state of the last stage group is '00' or '10' when the initial state is '00', and '01' or '11' when the initial state is '01'. A survival group path (which is represented by a thick dotted line) ending with state '00' on a grouped L–log$_2$ 4-th stage has an initial state of '00', and thus two Trellis group paths selectable on remaining stages are represented by thick one-dot-dashed lines that end with states '00' and '10' on the last stage.

An ATC encoding process according to another embodiment of the present general inventive concept performed under the selected Trellis paths of FIG. 10 will now be described with reference to FIGS. 11 through 14. In the present embodiment, a number in which stages are grouped may depend on a number of pulses whose mutual influences are to be considered. The present embodiment corresponds to a method of depth-first tree searching of an algebraic codebook applied to a Trellis structure. For simplicity of description, a case where two stages are grouped will be illustrated.

Referring to FIG. 11, in a single Viterbi encoding process performed in a (j-1)j stage, pulse location information associated with a state s of the (j-1)j stage group varies according to states of a previous stage group. Here, the (j-1)j stage group denotes a stage group including a (j-1)th stage and a j-th stage. When stages are grouped in a, a number of branches connected to a state s in each stage group is $2^a$. Referring to FIG. 11, the stages are grouped in two, and thus the number of branches connected to the state s is 4. In FIG. 11, thick solid lines represent the four branches.

FIG. 12 illustrates a single Viterbi encoding performed in a predetermined stage (e.g., a j-th stage) of the 4-state Trellis structure of FIG. 10 by using predetermined equation value $\phi_s^{(j-1)j}$. (FIG. 12 is being explained more in detail by "sub-operation 132b-1 and 132b-2 in paragraph [0111]")

The codebook searching method according to the present embodiment will now be described with respect to FIGS. 13 and 14.

In operation 131, the codebook searching apparatus 400 initializes the maximum value $\phi_i^0$ of a predetermined equation that is used to achieve an optimal pulse search in a limited number of initial states among a total of N states of a zeroth stage.

Then, in operation 132, single Viterbi encoding is performed on each initial state of every pair of stages from a first stage to an L–log$_2$ N-th stage (where L denotes the total number of stages) as illustrated in FIGS. 11 and 12. More specifically, in sub-operation 132a of operation 132, the codebook searching apparatus 400 calculates the value of Equation 7 using a sub-codebook allocated to a branch connecting a state j of a previous stage group to a state s of a current stage group, and stores the calculated value in a maximum value metric $$(A_{i1,s}^{(j-1)j}, A_{i2,s}^{(j-1)j}, A_{i3,s}^{(j-1)j}, A_{i4,s}^{(j-1)j}).$$

In operation 132b, a path corresponding to a combination of pulse locations which are most consistent with a predetermined component of an input signal is selected from among paths corresponding to pulse location combinations of predetermined pulse location sets that are allocated to a plurality of branches that connect one of states of the last stage in a stage group to states of the first stage in the stage group.

More specifically, in sub-operations 132b-1 and 132b-2 of operation 132b, the codebook searching apparatus 400 adds a maximum metric calculated and stored in operation 132a to a value $\phi_i^{(j-3 \times j-2)}$ of Equation 7 accumulated and stored until a (j-3)(j-2) stage group, in two overlapped loops using tracks allocated to (j-1)th and j-th stages of FIG. 12, and stores a largest value of Equation 7 in an accumulated value $\phi_s^{j-1j}$ of a current stage group as in Equation 13 (following below).

In sub-operation 132b-3, the codebook searching apparatus 400 searches for the optimal locations of two pulses $p^{j-1}$ and $p^j$ corresponding to the value $\phi_s^{(j-1)j}$. In operation 132b-4, the codebook searching apparatus 400 stores optimal pulse locations and group paths corresponding to the optimal pulse locations. The stored group paths are expressed in the following Equation 12;

$$\zeta_s^{(j-1)j} = \mathrm{argmax}(\phi_{i1}^{(j-3)(j-2)} + A_{i1,s}^{(j-1)j}, \qquad (12)$$
$$\phi_{i2}^{(j-3)(j-2)} + A_{i2,s}^{(j-1)j}, \phi_{i3}^{(j-3)(j-2)} + A_{i3,s}^{(j-1)j}, \phi_{i4}^{(j-3)(j-2)} + A_{i4,s}^{(j-1)j})$$

$$\phi_s^{(j-1)j} = \max(\phi_{i1}^{(j-3)(j-2)} + A_{i1,s}^{(j-1)j}, \qquad (13)$$
$$\phi_{i2}^{(j-3)(j-2)} + A_{i2,s}^{(j-1)j}, \phi_{i3}^{(j-3)(j-2)} + A_{i3,s}^{(j-1)j}, \phi_{i4}^{(j-3)(j-2)} + A_{i4,s}^{(j-1)j})$$

The codebook searching apparatus 400 repeats the operation 132 from a first stage group to a stage group including the L–log$_2$ N-th stage.

In operation 133, the codebook searching apparatus 400 determines N survival group paths by performing path backtracking based on a group path ranging from the first stage to the L–log$_2$ N-th stage that is stored in operation 132.

In operation 144 of FIG. 14, single Viterbi encoding is performed on two Trellis group paths ranging from the (L–log$_2$ N)+1-th stage to states of the last L-th stage that are determined according to the initial states of the N survival group paths.

In operation 144a, the codebook searching apparatus 400 ascertains the initial states of the N survival group paths using a path backtracking method and determines two Trellis group paths for a remaining log$_2$ N stages.

In operation 144b, the codebook searching apparatus 400 performs single Viterbi encoding on the two Trellis group paths.

In operations 144b-11 and 144b-12, the codebook searching apparatus 400 adds a value $A_{i,n}^{(j-1)j}$ of Equation 7 in the two Trellis list paths between the L–log$_2$ N-th stage and the L-th stage to a value $\phi_{i,n}^{(j-3 \times j-2)}$ of Equation 7 accumulated until a previous (j-3)(j-2) stage group, in two overlapped loops using tracks allocated to (j-1)th and j-th stages, from a (L–log$_2$ N)+2-th stage to the L-th stage, and stores a result of the addition in an accumulated value $\phi_{i,n}^{(j-1)j}$ of a (j-1)j stage group. The accumulated value $\phi_{i,n}^{(j-3 \times j-2)}$ stored from the (L–log$_2$ N)+2-th stage to the previous (j-3)(j-2) stage group is equal to a value $\phi_{i,n}^{L-\log_2 N}$ of Equation 13 that is obtained in a state i from the initial stage to the L−log$_2$ N-th stage.

In operations 144b-13 and 144b-14, the codebook searching apparatus 400 selects optimal locations of two pulses corresponding to the value $\phi_{i,n}^{(j-1)j}$ and stores information about the optimal pulse locations and group paths corresponding to the optimal pulse locations.

In operation 144b-2 and 144b-3, the codebook searching apparatus 400 selects a state n that maximizes an overall value of Equation 13 obtained in operation 144b-13.

In operation 144b-4, the codebook searching apparatus 400 stores an overall value of Equation 13, Trellis group path information, and pulse information.

In operation 144d, the codebook searching apparatus 400 selects a state i that maximizes the overall value of Equation 13 in the N survival group paths, by referring to the information obtained in operation 144b.

In operation 144e, the codebook searching apparatus 400 finally stores the Trellis group path information, the pulse location information, and the overall value of Equation 13 and outputs the Trellis group path information and the pulse location information.

EXPERIMENT

Table 4 illustrates performance obtained when the present general inventive concept using an ATC and a list Viterbi algorithm is applied to a fixed codebook search of a 8.85 kbps mode of an adaptive multi-rate (AMR) wideband speech coder, which is selected as a wideband speech coder standard in an international consortium called 3rd Generation Partnership Program (3GPP), and also illustrates performance obtained when an existing algebraic codebook of the AMR wideband speech coder is used. Calculation amounts when the present general inventive concept is applied to the fixed codebook search and when the existing algebraic codebook of the AMR wideband speech coder is used are illustrated in Table 5. The performances and calculation amounts of Tables 4 and 5 depend on the number of list Viterbi paths, k.

The performances were measured by perceptual evaluation of speech quality (PESQ), which is an ITU-T standard speech quality measuring software P.826. The calculation amounts were obtained by measuring frequency of pulse searches during encoding.

TABLE 4

| | The number of list Viterbi paths, k | PESQ (MOS) |
|---|---|---|
| Present general inventive concept (ATC-LVA) | k = 1 | 3.1653 |
| | k = 2 | 3.1761 |
| | k = 3 | 3.1788 |
| | k = 4 | 3.1816 |
| | k = 5 | 3.1843 |
| Previously Existing Algebraic codebook | | 3.1792 |

TABLE 5

| | The number of list Viterbi paths, k | Theoretical calculation amount |
|---|---|---|
| Present general inventive concept (ATC-LVA) | k = 1 | 192 |
| | k = 2 | 352 |
| | k = 3 | 512 |
| | k = 4 | 672 |
| | k = 5 | 832 |
| Previously Existing Algebraic codebook | | 768 |

Referring to Tables 4 and 5, when the number of list Viterbi paths is 4 or more, the performance of the present general inventive concept is better than the performance when the existing algebraic codebook of the AMR wideband speech encoder is used. In particular, when the number of list Viterbi paths is 4, quality of speech produced by the present general inventive concept is improved compared with a case where the existing algebraic codebook of the AMR wideband speech encoder is used, and the calculation amount of the present general inventive concept is reduced compared with the case where the existing algebraic codebook of the AMR wideband speech encoder is used.

According to the present general inventive concept, a path corresponding to pulse locations which are most consistent with a predetermined component of a speech signal is selected using a Trellis structure in which a predetermined pulse location set is allocated to each branch, so that a number of calculations necessary during a codebook search is reduced. Furthermore, the number of calculations necessary during a codebook search is further reduced by limiting a numbers of last states and initial states of the Trellis structure to a predetermined number.

In addition, use of a Trellis structure enables a codebook having an extended structure and a greater number of possible pulse location combinations than an existing algebraic codebook to be used, so that a codebook search that provides an improved-quality sound can be achieved without an increase in the number of calculations. In particular, pulses are searched for from each track in a form of a union of a plurality of sets each having exclusive pulse locations, instead of pulses being searched for from each track to which exclusive pulse locations are allocated as an existing algebraic codebook.

Moreover, the Trellis structure in which a predetermined pulse location set is allocated to each branch is used, and a path corresponding to a combination of pulse locations is selected for each of the stage groups into which the stages of the Trellis structure are grouped. Thus, a number of calculations required during a codebook search is reduced, and a codebook search that provides an improved-quality sound can be achieved due to a consideration of influences between pulses.

The embodiments of the present general inventive concept can be written as computer programs and can be implemented in general-use digital computers that execute the programs using a computer readable recording medium. The structure of data used in the embodiments of the present general inventive concept can be recorded on a computer readable recording medium in several ways.

The present general inventive concept can also be embodied as computer-readable codes on a computer-readable recording medium. The computer-readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The methods illustrated in FIGS. 8, 9, 13, and 14 can be stored in the computer-recorded medium in a form of computer-readable codes to perform the method when the computer reads the computer-readable codes of the recording medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of searching at least one of a codebook and an extended codebook which are including pulses that model a predetermined component of a speech signal, the method comprising:
   (a) selecting a predetermined number of paths corresponding to a predetermined number of pulse locations that are most consistent with the predetermined component, from among paths corresponding to pulse locations of a predetermined pulse location set allocated to at least one branch that connects one state belonging to a stage of a predetermined Trellis structure to an other state belonging to the other stages, where an extended track of the extended codebook is allocated to each stage;
   (b) performing operation (a) on each of states other than the one state; and
   (c) selecting a path corresponding to pulse locations that are the most consistent with the predetermined component, from among paths including the paths selected in operations (a) and (b),
   wherein the predetermined pulse location set corresponds to a sub-codebook, generated by dividing the extended codebook, and each extended tracks of the extended codebook corresponds to a union of at least two tracks of an algebraic codebook.

2. The method of claim 1, wherein:
   the states on which operations (a) and (b) are performed belong to one stage of the predetermined Trellis structure;
   the method further comprises the operation of (d) performing operations (a) and (b) on stages other than the one stage; and
   operation (c) comprises selecting a path corresponding to pulse locations that are the most consistent with the predetermined component from among paths including the paths selected in operations (a), (b), and (d).

3. The method of claim 2, wherein operation (d) comprises:
   performing operations (a) and (b) on the stages of the Trellis structure in an order from a first stage to a last stage.

4. The method of claim 2, further comprising an operation of restricting a number of initial states of the predetermined Trellis structure to a first number and restricting a number of last states corresponding to the restricted initial states to a second number.

5. The method of claim 4, wherein:
   operation (d) comprises performing operations (a) and (b) on a first stage to a predetermined number-th stage of the predetermined Trellis structure in a sequence;
   the method further comprises operations of:
   (e) ascertaining initial states corresponding to one of states of the predetermined number-th stage by tracking paths starting from one state of the predetermined number-th stage based on the paths selected in operations (a), (b), and (d), and determining paths ranging from the one state of the predetermined number-th stage to last states, a number of which is restricted to the second number;
   (f) performing operation (e) on each of states of the predetermined number-th stage that are other than the one state of the predetermined number-th stage; and
   (g) performing operations (a) and (b) on the states on the paths determined in operations (e) and (f); and
   operation (c) comprises selecting paths corresponding to pulse locations that are most consistent with the predetermined component from among paths including the paths selected in operations (a), (b), (d), and (g).

6. The method of claim 5, wherein:
   the predetermined Trellis structure comprises N ($=2^v$, where v denote an integer) states and L stages;
   the first number is $2^w$ ($0 \leq w \leq v$) and the second number is $2^{v-w}$; and
   the predetermined number-th stage is a L−$\log_2$N-th stage.

7. The method of claim 2, further comprising the operation of restricting a number of initial states of the Trellis structure to a first number and restricting a number of last states corresponding to the restricted initial states to a second number.

8. The method of claim 7, wherein:
   operation (c) comprises performing operations (a) and (b) on a first stage group to a predetermined number-th stage group of the Trellis structure in a sequence;
   the method further comprises operations of:
   (e) ascertaining initial states corresponding to one of the states of the last stage of the predetermined number-th stage group by back tracking paths starting from the one state of the last stage based on the paths selected in operations (a), (b), and (c), and determining paths ranging from the one state of the last stage to the last states the number of which is restricted to the second number;
   (f) performing operation (e) on each of states of the last stage of the predetermined number-th stage group that are other than the one state of the last stage of the predetermined number-th stage group; and
   (g) performing operations (a) and (b) on the states on paths determined in operations (e) and (f); and
   operation (d) comprises selecting a path corresponding to pulse locations most consistent with the predetermined component from among paths including the paths selected in operations (a), (b), (c), and (g).

9. The method of claim 8, wherein:
   the Trellis structure comprises N ($=2^v$, where v denote an integer) states and L stages;
   the first number is $2^w$ ($0 \leq w \leq v$) and the second number is $2^{v-w}$; and
   the predetermined number-th stage is a L−$\log_2$N-th stage.

10. The method of claim 1, wherein the predetermined component is a signal obtained by filtering a speech signal with use of a linear prediction encoding method and removing a pitch component from the speech signal.

11. The method of claim 1, wherein the Trellis structure is constructed such that a first extended track of the extended codebook is allocated to a first stage, a second extended track of the extended codebook is allocated to a second stage, sub-codebooks generated by dividing the first extended track are allocated to branches of the first stage, and sub-codebooks generated by dividing the second extended track are allocated to branches of the second stage.

12. A method of searching at least one of a codebook and an extended codebook which are including pulses that model a predetermined component of a speech signal, the method comprising operations of:
   (a) selecting a path corresponding to a pulse location combination most consistent with the predetermined component, from among paths corresponding to the pulse location combinations of predetermined pulse location sets allocated to a plurality of branches that connect one state of a last stage of one stage group of a plurality of stage groups of a Trellis structure to states of a first stage of the one stage group, wherein the stage groups are obtained by grouping stages of the Trellis structure in a predetermined number and an extended track of the extended codebook is allocated to each stage;

(b) performing operation (a) on each of states other than the one state of the last stage;

(c) performing operations (a) and (b) on stage groups other than the one stage group; and (d) selecting a path corresponding to pulse locations that are most consistent with the predetermined component, from among paths including the paths selected in operations (a), (b), and (c), wherein the predetermined pulse location sets corresponds to sub-codebooks generated by dividing the extended codebook, and each extended tracks of the extended codebook corresponds to a union of at least two tracks of an algebraic codebook.

13. The method of claim 12, wherein the predetermined component is a signal obtained by filtering a speech signal using a linear prediction encoding method and removing a pitch component from the speech signal.

14. The method of claim 12, wherein operation (c) comprises performing operations (a) and (b) on the plurality of stage groups of the Trellis structure in order from a first stage group to a last stage group.

15. The method of claim 12, wherein the Trellis structure is constructed such that a first extended track of the extended codebook is allocated to a first stage, a second extended track of the extended codebook is allocated to a second stage, sub-codebooks generated by dividing the first extended track are allocated to a plurality of branches of the first stage, and sub-codebooks generated by dividing the second extended track are allocated to a plurality of branches of the second stage.

16. A non-transitory computer readable recording medium which records a method of searching at least one of a codebook and an extended codebook which are including pulses that model a predetermined component of a speech signal and extended tracks that are a union of a plurality of sets each having exclusive pulse locations, the method comprising operations of:

(a) selecting a predetermined number of paths corresponding to a predetermined number of pulse locations that are most consistent with the predetermined component, from among paths corresponding to pulse locations of a predetermined pulse location set allocated to at least one branch that connects one state belonging to a stage of a predetermined Trellis structure to an other state belonging to the stages, where an extended track of the extended codebook is allocated to each stage;

(b) performing operation (a) on each of states other than the one state; and (c) selecting a path corresponding to pulse locations that are most consistent with the predetermined component, from among paths including the paths selected in operations (a) and (b), wherein the predetermined pulse location set corresponds to a sub-codebook generated by dividing the extended codebook, and each extended tracks of the extended codebook corresponds to a union of at least two tracks of an algebraic codebook.

* * * * *